United States Patent Office 3,415,879
Patented Dec. 10, 1968

3,415,879
N-ACYL DERIVATIVES OF DICHLORO-THIOBENZAMIDES
Sidney E. Callander, Sittingbourne, and John Yates, Chestfield, Whitstable, Kent, England, assignors to Shell Oil Company, New York, N.Y., a corporation of Delaware
No Drawing. Filed Dec. 11, 1964, Ser. No. 417,829
Claims priority, application Great Britain, Dec. 16, 1963, 49,553/63
11 Claims. (Cl. 260—558)

ABSTRACT OF THE DISCLOSURE

Certain N,N-bis-acyl and N-acyl derivatives of dichlorothiobenzamides wherein the acyl is derived from certain monocarboxylic acids or from certain di-carboxylic acids, useful as herbicides.

---

This invention relates to novel thiobenzamide derivatives, in particular the N-acyl derivatives, to herbicidal compositions containing them and to their use.

Modern agricultural practice has need for highly effective herbicides which do away with the necessity of hand cultivating. Herbicides which eliminate weeds from railroad sidings and industrial areas are much in demand. Compounds which are particularly effective in eradication or control of undesired vegetation and can be applied to the soil prior to the germination of weed seeds are particularly desirable.

A new class of highly effective herbicides has now been discovered and this invention is directed to these novel compounds, to their use as herbicides and to herbicidal formulations containing these compounds.

The novel compounds of the invention are represented by the formula:

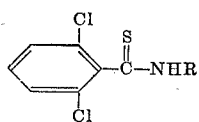

where R contains up to 20 carbon atoms and is the acyl group of a mono-carboxylic acid, preferably an arylalkanoyl, diarylalkanoyl or aryloxyalkanoyl group, or that of a di-carboxylic acid of which each carbonyl group is attached to a benzamide nitrogen atom. Examples of other acyl groups of mono-carboxylic acids include alkanoyl, alkenoyl, alkoxyalkanoyl and cycloalkanoyl groups, particular examples being acetyl and propionyl groups. Particular examples of the preferred acyl groups are a phenylacetyl, naphthylacetyl, diphenylacetyl and especially a phenoxyacetyl group.

The preferred compounds according to the invention are those having an aromatic group linked, through at least one >C=S grouping, to a second aromatic group. Thus with the preferred acyl groups from mono-carboxylic acids the acyl group itself furnishes the second aromatic group. On the other hand, with an acyl group from a di-carboxylic acid, one of the acyl carbonyl groups is attached to the nitrogen atom and the remaining carbonyl group is attached to the nitrogen atom of a further molecule of 2,6-dichlorothiobenzamide, which provides the second aromatic group. These latter compounds are illustrated by the following example wherein the acyl group is oxaloyl.

Examples of the acyl group of a dicarboxylic acid are phthaloyl, succinoyl, glutaroyl, adipoyl and oxaloyl groups.

The acyl groups in the compounds of the invention may bear one or more substituents, those preferred being chlorine and/or alkyl groups. The alkyl groups preferably each contain one to four carbon atoms. Thus among the preferred compounds are those of the formula:

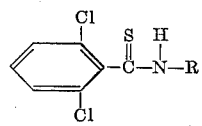

wherein R is acyl of up to 20 carbon atoms and is either unsubstituted dicarboxylic acid or substituted dicarboxylic acid substituted by at least one of chlorine or an alkyl group of one to four carbon atoms, methyl being the most preferred. Such compounds are preferred because of their physical properties and excellent qualities as herbicides.

Specific examples of compounds of the invention are:

N-phenylacetyl-2,6-dichlorothiobenzamide;
N-(2-chorophenylacetyl)-2,6-dichlorothiobenzamide;
N-(4-chlorophenylacetyl)-2,6-dichlorothiobenzamide;
N-(1′-naphthylacetyl)-2,6-dichlorothiobenzamide;
N-(diphenylacetyl)-2,6-dichlorothiobenzamide;
N-(4-chlorophenoxyacetyl)-2,6-dichlorothiobenzamide;
N-(2-chlorophenoxyacetyl)-2,6-dichlorothiobenzamide;
N-(2,4-dichlorophenoxyacetyl)-2,6-dichlorothiobenzamide;
N-(2,4,5-trichlorophenoxyacetyl)-2,6-dichlorothiobenzamide
N-(4-chloro-2-methylphenoxyacetyl)-2,6-dichlorothiobenzamide;
N-acetyl-2,6-dichlorothiobenzamide;
N-propionyl-2,6-dichlorothiobenzamide;
N,N′-bis-(2,6-dichlorothiobenzoyl)oxamide;
N,N′-bis-(2,6-dichlorothiobenzoyl)adipamide.

The process for the preparation of the novel compounds of the invention may be carried out by known methods. Thus the novel compound may be produced by the reaction of 2,6-dichlorothiobenzamide with the appropriate acid chloride or acid anhydride, preferably in an inert solvent. The reaction may be carried out in the presence or absence of base. The reaction is usually effected at an elevated temperature, for example in the range 30° to 150° C.

3,415,879

The inert solvent may be a hydrocarbon for example benzene, a ketone for example acetone or propanone-2, or an ether for example diethyl ether, 1,2-dimethoxyethane, dioxane or tetrahydrofuran.

The following examples illustrate how selected compounds of the invention may be prepared and illustrate the herbicidal activity of many of the members of this class of novel compounds.

EXAMPLE I

Preparation of N-phenylacetyl-2,6-dichlorothiobenzamide

Four parts of phenylacetic acid were refluxed with four parts of thionyl chloride in benzene for 2½ hours. The resulting solution was stripped of solvent and the residual oil refluxed with five parts of 2,6-dichlorothiobenzamide in benzene for 1 hour. The solvent was then removed and the residue extracted 4 times with hot hexane leaving the desired product in an impure form. It was recrystallized from ethanol yielding 2.9 parts of N-phenylacetyl-2,6-dichlorothiobenzamide (yellow crystals), M.P. 189° C. The structure was confirmed by elemental analysis: percent by weight.

Calculated for $C_{15}H_{11}NOSCl_2$: C, 55.6; H, 3.4; N, 4.3; S, 9.8; Cl, 21.9. Found: C, 55.8; H, 3.6; N, 4.4; S, 10.0; Cl, 23.3.

EXAMPLE II

Preparation of N-(2-chlorophenylacetyl)-2,6-dichlorothiobenzamide

This compound was prepared in the same manner as described in Example I using 3 parts of 2-chlorophenylacetic acid and 3.2 parts of 2,6-dichlorothiobenzamide as starting materials. The crude product was recrystallized from a benzene/hexane mixture yielding yellow crystals of N-(2-chlorophenylacetyl) - 2,6-dichlorothiobenzamide, M.P. 179° C. The structure was confirmed by elemental analysis: percent by weight.

Calculated for $C_{15}H_{10}NOSCl_3$: C, 50.2; H, 2.8; N, 3.9; S, 8.9; Cl, 29.7; Found: C, 50.6; H, 2.8; N, 3.8; S, 9.2; Cl, 30.7.

EXAMPLE III

Preparation of N-(4-chlorophenylacetyl)-2,6-dichlorothiobenzamide

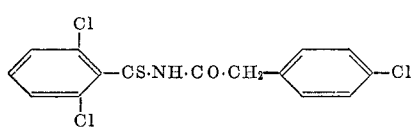

This compound was prepared in the manner as described in Example I using 5 parts of 4-chlorophenylacetic acid and 5 parts 2,6-dichlorothiobenzamide as starting materials. The crude product was recrystallized from benzene yielding yellow crystals of N-(4-chlorophenylacetyl)-2,6-dichlorothiobenzamide, M.P. 197° C. The structure was confirmed by elemental analysis: percent by weight.

Calculated for $C_{15}H_{10}NOSCl_3$: C, 50.2; H, 2.8; N, 3.9; S, 8.9; Cl, 29.7. Found: C, 50.6; H, 2.9; N, 3.9; S, 9.2; Cl, 30.7.

EXAMPLE IV

Preparation of N-(1'-naphthylacetyl)-2,6-dichlorothiobenzamide

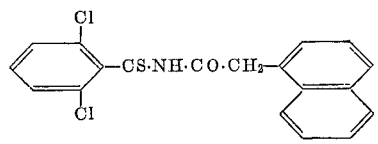

This compound was prepared by the same method as described in Example I using 3.2 parts of 1'-naphthylacetic acid and 3 parts 2,6-dichlorothiobenzamide as starting materials. The crude product was recrystallized from ethanol yielding yellow crystals of N-(1'-naphthylacetyl)-2,6-dichlorothiobenzamide, M.P. 169° C. The structure was confirmed by elemental analysis: percent by weight.

Calculated for $C_{19}H_{13}NOSCl_2$: C, 60.8; H, 3.5; N, 3.7; S, 9.6; Cl, 19.0. Found: C, 61.3; H, 3.7; N, 3.7; S, 9.0; Cl, 19.5.

EXAMPLE V

Preparation of N-diphenylacetyl-2,6-dichlorothiobenzamide

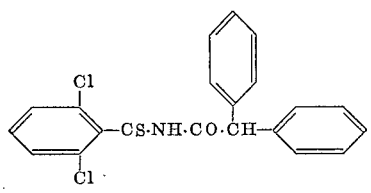

This compound was prepared by the same method as described in Example I using 4 parts of diphenylacetic acid and 3 parts 2,6-dichlorothiobenzamide as starting materials. The crude product was recrystallized from a benzene/hexane mixture to yield yellow crystals of N-diphenylacetyl-2,6-dichlorothiobenzamide, M.P. 140° C. The structure was confirmed by elemental analysis: percent by weight.

Calculated for $C_{21}H_{15}NOSCl_2$: C, 63.2; H, 3.8; N, 3.5; S, 8.0; Cl, 17.7. Found: C, 62.5; H, 3.7; N, 3.4; S, 8.2; Cl, 18.6.

EXAMPLE VI

Preparation of N-(4-chlorophenoxyacetyl)-2,6-dichlorothiobenzamide

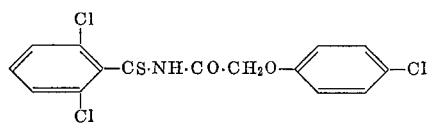

This compound was prepared by the same method as described in Example I using 5 parts of 4-chlorophenoxyacetic acid 4 parts and 2,6-dichlorothiobenzamide as starting materials. The crude product was recrystallized from ethanol yielding yellow crystals of N-(4-chlorophenoxyacetyl)-2,6-dichlorothiobenzamide. M.P. 153° to 154° C. The structure was confirmed by elemental analysis: percent by weight.

Calculated for $C_{15}H_{10}NO_2SCl_3$: C, 48.1; H, 2.7; N, 3.7; S, 8.6; Cl, 28.4. Found: C, 48.3; H, 2.5; N, 3.7; S, 8.8; Cl, 28.7.

EXAMPLE VII

Preparation of N-(2-chlorophenoxyacetyl)-2,6-dichlorothiobenzamide

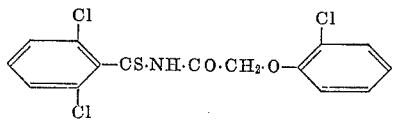

This compound was prepared by the same method as described in Example I using 5 parts of 2-chlorophenoxyacetic acid and 4 parts 2,6-dichlorothiobenzamide as starting materials. The crude product was recrystallized from ethanol yielding yellow crystals of N-(2-chlorophenoxyacetyl)-2,6-dichlorothiobenzamide, M.P. 159° to 160° C. The structure was confirmed by elemental analysis: percent by weight.

Calculated for $C_{15}H_{10}NO_2SCl_3$: C, 48.1; H, 2.7; N, 3.7; S, 8.6; Cl, 28.4. Found: C, 47.6; H, 2.8; N, 3.6; S, 9.0; Cl, 28.9.

EXAMPLE VIII

Preparation of N-(2,4-dichlorophenoxyacetyl)-2,6-dichlorothiobenzamide

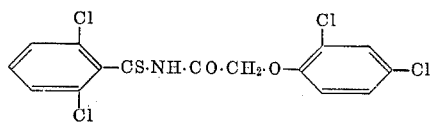

This compound was prepared by the same method as described in Example I using 5 parts of 2,4-dichlorophenoxyacetic acid and 4 parts 2,6-dichlorothiobenzamide as starting materials. The crude product was recrystallized from a benzene/hexane mixture yielding N-(2,4-dichlorophenoxyacetyl)-2,6-dichlorothiobenzamide in the form of yellow crystals, M.P. 159° to 160° C. The structure was confirmed by elemental analysis: percent by weight.

Calculated for $C_{15}H_9NO_2SCl_4$: C, 44.0; H, 2.2; N, 3.4; S, 7.8; Cl, 34.6. Found: C, 45.1; H, 2.3; N, 3.5; S, 8.3; Cl, 35.1.

EXAMPLE IX

Preparation of N-(2,4,5-trichlorophenoxyacetyl)-2,6-dichlorothiobenzamide

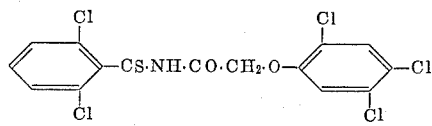

This compound was prepared by the same method as described in Example I using 5 parts of 2,4,5-trichlorophenoxyacetic acid and 3.5 parts 2,6-dichlorothiobenzamide as starting materials. The crude product was recrystallized from ethanol yielding N-(2,4,5-trichlorophenoxyacetyl)-2,6-dichlorothiobenzamide in the form of yellow crystals, M.P. 167° C. The structure was confirmed by elemental analysis: percent by weight.

Calculated for $C_{15}H_8NO_2SCl_5$: C, 40.8; H, 1.8; N, 3.1; S, 7.2; Cl, 40.0. Found: C, 40.7; H, 1.8; N, 3.0; S, 7.5; Cl, 39.8.

EXAMPLE X

Preparation of N-(4-chloro-2-methylphenoxyacetyl)-2,6-dichlorothiobenzamide

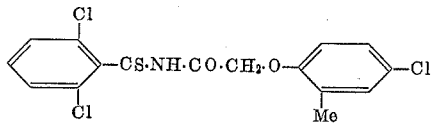

Eight parts of 4-chloro-2-methylphenoxyacetic acid and 8.3 parts of its acid chloride were refluxed in 100 parts of benzene for 6 hours. The reaction mixture was stripped of solvent at 100° C. and the residue triturated with cold hexane leaving 13.4 parts of a solid material, M.P. 74° to 86° C. Two recrystallizations from a benzen/hexane mixture gave 10.8 parts of a material, M.P. 80° to 88° C. This compound, thought to be the acid anhydride, was refluxed with 4 parts 2,6-dichlorothiobenzamide in benzene for 5 hours. The resulting solution was stripped of solvent and the residue triturated with hot hexane yielding orange-yellow crystals of N-(4-chloro-2-methylphenoxyacetyl) - 2,6 - dichlorothiobenzamide, M.P. 150° to 152° C. Two recrystallizations from a benzene/hexane mixture raised the melting point to 161° C. The structure was confirmed by elemental analysis: percent by weight.

Calculated for $C_{16}H_{12}NO_2SCl_3$: C, 49.4; H, 3.1; N, 3.6; S, 8.2; Cl, 27.4. Found: C, 49.7; H, 3.2; N, 3.6; S, 8.6; Cl, 27.8.

EXAMPLE XI

Preparation of N-acetyl-2,6-dichlorothiobenzamide

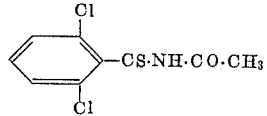

Twenty-five parts of 2,6-dichlorothiobenzamide were dissolved in ether and 20.2 parts of triethylamine were added. The solution was cooled to 10° C. and stirred during the addition of 12.6 parts of acetyl chloride in ether. The precipitate of the amine salt was filtered off, the orange-colored solution evaporated and the residue was boiled three times with hexane. Bright orange prisms of N-acetyl-2,6-dichlorothiobenzamide, M.P. 184° to 185° C. remained. The structure was confirmed by elemental analysis: percent by weight.

Calculated for $C_9H_7NOSCl_2$: C, 43.6; H, 2.8; N, 5.6; S, 12.9; Cl, 28.6. Found: C, 44.2; H, 3.0; N, 5.6; S, 13.3; Cl, 28.8.

EXAMPLE XII

Preparation of N-propionyl-2,6-dichlorothiobenzamide

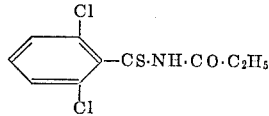

Twenty parts of 2,6-dichlorothiobenzamide and 100 parts propionic anhydride were heated on a water bath for one hour. The resulting mixture was allowed to stand at room temperature for two days and then poured into water. After allowing to stand for a further twenty hours a yellow solid separated out which was recrystallized from a benzene/light petroleum mixture yielding 20 parts of orange crystals of N-propionyl-2,6-dichlorothiobenzamide, M.P. 127° to 128° C. Yield 76%. The structure was confirmed by elemental analysis: percent by weight.

Calculated for $C_{10}H_9NOSCl_2$: C, 45.8; H, 3.4; N, 5.3; S, 12.2; Cl, 27.1. Found: C, 46.1; H, 3.5; N, 5.4; S, 12.1; Cl, 27.2.

EXAMPLE XIII

Preparation of N,N'-bis-(2,6-dichlorothiobenzoyl) oxamide

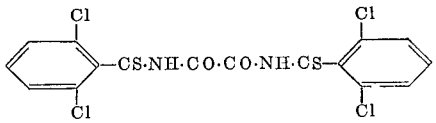

20.6 parts of 2,6-dichlorothiobenzamide 8.5 parts oxaloyl chloride in acetone were allowed to react at 0° C. and then left at room temperature for twenty hours. The reaction mixture was poured into water and extracted with diethyl ether. The ethereal mixture was evaporated down and the residue crystallized from benzene yielding red crystals of N,N' - bis - (2,6 - dichlorothiobenzoyl) oxamide, M.P. 169° to 171° C. (decomposition). The structure was confirmed by elemental analysis:percent by weight.

Calculated for $C_{16}H_8NO_2S_2Cl_4$: C, 41.2; H, 1.7; N, 6.0; S, 13.7; Cl, 30.5. Found: C, 41.4; H, 1.7; N, 6.2; S, 13.6; Cl, 30.2.

EXAMPLE XIV

Preparation of N,N'-bis-(2,6-dichlorothiobenzoyl)-adipamide

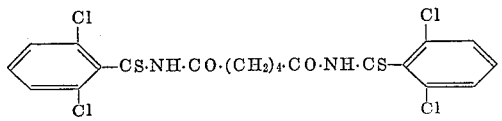

12.4 parts of 2,6 - dichlorothiobenzamide were added to 11 parts of adipoyl chloride in acetone at 0° C. To this mixture was added 9.5 parts of pyridine in acetone dropwise at 0° C. After the addition the mixture was allowed to stand at room temperature for 3 hours. The mixture was then poured into ice water whereupon a yellow solid separated out. The solid was filtered and recrystallized from an acetone/ethanol mixture yielding 14 parts of yellow crystals of N,N' - bis - (2,6 - dichlorothiobenzoyl)adipamide M.P. 209° to 210° C. yield 89%. The structure was confirmed by elemental analysis:percent by weight.

Calculated for $C_{20}H_{16}N_2O_2S_2Cl_4$: C, 46.0; H, 3.1; N, 5.4; S, 12.2; Cl, 27.2. Found: C, 46.2; H, 3.4; N, 5.4; S, 12.3; Cl, 27.3.

EXAMPLE XV

Preparation of N-[2-(2,4-dichlorophenoxy)propionyl]-2,6-dichlorothiobenzonide

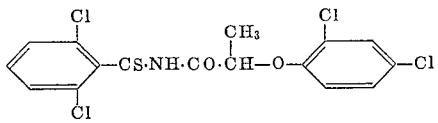

This compound was prepared by the method described in Example I, using 2,6 - dichlorothiobenzamide and 2-(2,4 - dichlorophenoxy)propionic acid as starting materials. The crude product was recrystallized from isopropanol to yield N - [2 - (2,4 - dichlorophenoxy) propionyl] - 2,6 - dichlorothiobenzamide M.P. 137–138° C. The stucture was confirmed by elemental analysis:percent by weight.

Calculated: C, 47.2; H, 2.7; N, 3.4; S, 7.9; Cl, 34.7. Found: C, 46.9; H, 2.6; N, 3.2; S, 8.2; Cl, 35.0.

EXAMPLE XVI

Preparation of N-[2-(4-chloro-2-methylphenoxy)propionyl]-2,6-dichlorothiobenzamide

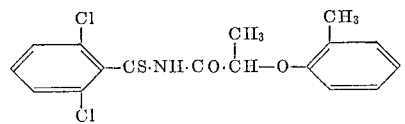

This compound was prepared by the method described in Example I, using 2,6 - dichlorothiobenzamide and 2-(4 - chloro - 2 - methylphenoxy)propionic acid as starting materials, and methyl ethyl ketone as solvent. The crude product was recrystallized from ethanol to yield N - [2 - (4 - chloro - 2 - methylphenoxy)propionyl]-2,6 - dichlorothiobenzamide, M.P. 138–139° C. The structure was confirmed by elemental analysis:percent by weight.

Calculated: C, 50.8; H, 3.5; N, 3.5; S, 8.0; Cl, 26.4. Found: C, 52.6; H, 3.9; N, 3.5; S, 8.1; Cl, 26.8.

EXAMPLE XVII

Tests for herbicidal activity

To estimate their herbicidal activity certain compounds have been tested using a representative range of plants; oat (O), ryegrass (RG), sweet corn (SC), pea (P), sugar beet (SB), linseed (L) and mustard (M).

The tests fall into two categories, pre-emergence and post-emergence tests. The pre-emergence tests involve the spraying of the soil in which the seeds of the plant species mentioned above have recently been sown. The post-emergence tests are further divided into soil drench and foliar spray tests, self-explanatory operations which are carried out after the seeds have germinated. Details of the tests are given below in which volume (v.) and weight (w.) bear the same relation as the litre does to the kilogram.

Each compound to be tested is made up in the form of the following composition:

```
Acetone _____v__  40
Water _____v__  60
Surface active agent _____w__  0.5
Compound under test; varying amounts.
```

The surface active agent used is an alkylphenol/ethylene oxide condensate available under the trade name Triton X-155.

The seeds of the plant species mentioned above are sown and allowed to germinate in sterile compost.

In the soil spray and soil drench tests, the sown soil and the soil bearing the sedling plant, were sprayed at a volume equivalent to 50 gallons per acre and drenched at a volume equivalent to 1000 gallons per acre respectively. In the foliar spray tests, similar seedling plants were sprayed with a volume equivalent to 50 gallons per acre. Control tests were also carried out in which sown soil, seedling-plant bearing soil, and plants were treated with the same compositions but containing no active ingredient.

The phytotoxic effect of the compound applied was assessed by determining the reduction in fresh weight of stem and leaf of the treated plants over the control plants and plotting a regression curve relating the growth inhibition (G.I.) and the dosage of compound applied. The dosage required for 50% and 90% growth inhibition (i.e., that weight of compound required to give a reduction in the fresh weight of plant leaf and stem of 50 to 90%), is given in Table I. Table I gives the dosage in the form of pounds per acre; X, Y and Z represent dosages of greater than 10, 12.5 and 20 pounds per acre, respectively.

TABLE L.—HERBICIDAL ACTIVITY OF ACYL DERIVATIVES OF MONO-CARBOXYLIC ACIDS

Structure: 2,6-dichlorophenyl-C(=S)-NHR

| | GI level, percent | Growth Inhibition Dose in lbs./acre | | | | | | | | | | | | | | | | | | | | |
|---|---|---|---|---|---|---|---|---|---|---|---|---|---|---|---|---|---|---|---|---|---|---|
| | | Pre-emergence (seeds) Soil spray | | | | | | Post-emergence (plants) Foliar spray | | | | | | | Soil drench | | | | | | |
| | | SC | O | RG | P | L | M | SB | SC | O | RG | P | P | M | SB | SC | O | RG | P | L | M | SB |
| R=phenylacetyl | 50 | 6.0 | <1 | <1 | 3.9 | <1 | <1 | <1 | Y | 6.2 | 10.4 | Y | Y | Y | 10.4 | 8.8 | 1.2 | <1 | N | N | N | N |
| | 90 | 9.1 | <1 | <1 | 10.0 | X | 9.0 | <1 | Y | Y | Y | Y | Y | Y | Y | N | N | N | N | N | N | N |
| R=2-chlorophenylacetyl | 50 | 3.6 | <1 | <1 | 1.7 | 1.2 | 1.1 | <1 | Y | 9.6 | Y | Y | Y | Y | 8.9 | | | | | | | |
| | 90 | X | <1 | <1 | 7.5 | 10.0 | X | <1 | Y | Y | Y | Y | Y | Y | Y | | | | | | | |
| R=4-chlorophenylacetyl | 50 | X | <1 | 1.8 | X | 4.4 | 4.3 | 1.5 | Y | 12.5 | Y | Y | Y | Y | Y | 9.2 | 2.5 | 1.5 | N | N | N | 16.9 |
| | 90 | | 2.3 | 4.6 | X | X | X | 7.9 | Y | Y | Y | Y | Y | Y | Y | N | 11.5 | 15.0 | N | N | N | N |
| R=diphenylacetyl | 50 | X | <1 | <1 | <1 | <1 | <1 | <1 | Y | .18 | 12.5 | Y | Y | Y | 9.7 | 1.5 | <1 | <1 | 2.6 | 2.2 | 4.0 | 1.2 |
| R=4-chlorophenoxyacetyl | 50 | <1 | <1 | <1 | 3.5 | 1.3 | 1.1 | <1 | Y | 12.5 | Y | Y | Y | Y | Y | 3.2 | N | N | 12.8 | N | N | 12.8 |
| | 90 | 2.8 | <1 | <1 | 9.1 | 3.1 | 3.1 | <1 | Y | Y | Y | Y | Y | Y | Y | N | N | N | N | N | N | N |
| R=2-chlorophenoxyacetyl | 50 | 7.6 | <1 | <1 | 2.9 | <1 | <1 | 1.0 | Y | Y | Y | Y | Y | Y | Y | | | | | | | |
| | 90 | 4.0 | <1 | 1.4 | X | <1 | 1.4 | 1.4 | Y | Y | Y | Y | Y | Y | Y | | | | | | | |
| R=2,4-dichlorophenoxyacetyl | 50 | X | <1 | 2.0 | <1 | 6.8 | 3.6 | 1.2 | Y | X | X | X | X | 7.5 | 7.3 | 13.1 | 1.0 | 1.6 | 8.0 | 5.1 | 2.0 | 6.2 |
| | 90 | Y | <1 | <1 | 12.5 | 5.8 | 0.9 | 1.2 | X | X | 1.2 | Y | 2.6 | X | 2.5 | 3.6 | <1 | N | 8.5 | 2.6 | X | X |
| R=4-chloro-2-methyl phenoxyacetyl | 50 | <0.9 | <1.2 | <1.2 | X | Y | Y | 0.9 | | | | | | | | | | | | | | |
| | 90 | | 0.9 | 0.9 | <0.9 | | | | | | | | | | | | | | | | | |
| R=acetyl | 50 | >L | <1 | <1 | <1 | <1 | <1 | <1 | 6.7 | <1 | <1 | 4.2 | X | 2.1 | 1.1 | 3.7 | <1 | <1 | N | N | N | 4.7 |
| R=propionyl | 50 | | | | | | | | 4.6 | <1 | <1 | 6.4 | X | X | X | | | | | | | |
| N,N'-Bis-(2,6-dichlorothiobenzoyl)-oxamide | 50 | <1 | <1 | <1 | <1 | <1 | <1 | <1 | X | <1 | X | X | 9.2 | 5.6 | 1.5 | <1 | <1 | 2.6 | N | 5.0 | 2.5 | |
| N-[2-(4-chloro-2-methylphenoxy)propionyl]-2,6-dichlorothiobenzamide | 50 | 2.4 | <1 | <1 | 1.7 | <1 | <1 | <1 | X | 9.5 | X | X | X | X | 6.0 | 4.1 | 3.4 | N | 9.6 | 5.0 | | |

The thiobenzamide herbicides of this invention are not very volatile, and tend to remain in that part of the soil into which they are introduced. However, they may be moved through the soil by water. Consequently, by appropriate selection of the part of the soil into which they are introduced, relative to the seeds of wanted plants, and those of unwanted plants, and taking into account the effect of water, these herbicides can be used to prevent all plant growth, even at relatively low dosages in some cases, or its selectivity can be improved to prevent growth of unwanted plants without harm to wanted plants. For example, as is well known, only those weed seeds which are present within about one-quarter inch of the surface of the soil will germinate, whereas the seeds of cereal, and other, crops, for example, ordinarily are sown about one-half to three-quarters of an inch below the surface of the soil, and germinate well under these conditions. Thus, by introducing these herbicides only into the top one-quarter inch of the soil, and avoiding excessive watering, germination of the weed seeds can be prevented, while germination of the crop seeds will not be affected. Of course, if complete kill of all plants in a given portion of soil is desired, it is necessary only to introduce these herbicides throughout that portion of soil.

The herbicides of the invention are soluble in the common organic horticultural solvents. Thus, according to the intended method of application the character of the plants involved, and the concentration of herbicide to be used, the herbicides of the invention can be formulated as solutions or suspensions in water, or a suitable organic solvent, as a dispersion or emulsion of the active agent in a non-solvent therefor, as an emulsion of a solution of the active agent in a suitable solvent emulsified with a second, inhomogeneous liquid, or as a solid comprising the active agent or agents sorbed on a sorptive solid carrier. Where a light hydrocarbon oil is to be used as carrier, suitable materials for the purpose include any of the spray oils marketed commercially for this purpose. The highly aromatic hydrocarbons are preferred. Thus, highly refined aromatic hydrocarbons, such as benzene, toluene, xylene, ethylbenzene, cumene or isodurene, may be used, or the carrier may be a less highly refined relatively aromatic hydrocarbon mixture, such as a coal tar fraction, a straight-run petroleum distillate, a thermally or catalytically cracked hydrocarbon oil, platformate, or the like. Suitable solvents may also comprise a relatively aliphatic hydrocarbon material, or mixtures of aromatic and aliphatic hydrocarbons. Suitable aliphatic hydrocarbon materials include refined gas oil, light lubricating oil fractions, refined kerosene, mineral seal oil and the like. Spray oils boiling in the range of from 275° F. to 575° F. are suitable, as are spray oils boiling in the range of from 575° F. to 1000° F. and having an unsulfonatable residue of at least 75%. Mixtures of such spray oils also may be used.

Although the solvent usually will be of mineral origin, oils of animal or of vegetable origin also may be employed in or as the carrier. In appropriate cases oxygenated solvents, such as alcohols, e.g., methanol, ethanol, isopropyl alcohol, n-butyl alcohol and amyl alcohol, ketones, e.g., acetone, methyl ethyl ketone, methyl isobutyl ketone, etc., glycols and glycol ethers and chlorinated solvents may be employed in or as the carrier. As already pointed out, lower alkanoic acids may in some cases be used to advantage.

Solutions of the active agent may be applied as such to the plants or to the soil that is to be treated, or it may be suspended in water and the suspension or emulsion applied to the plants or soil. Thus, a relatively concentrated solution of the active agent in a water-immiscible solvent may be prepared, with added emulsifying, dispersing or other surface-active agents, and the concentrate diluted in the spray tank with water to form a uniform fine emulsion which can be applied by conventional spray devices. Emulsions or dispersions of the active agent as such in water may also be prepared and applied.

Suitable emulsifiable concentrates, adapted for dispersion in water to provide a sprayable composition, ordinarily will contain between about 5% by weight and about 50% by weight of active agent dissolved in a hydrocarbon or other suitable water-immiscible solvent. Minor amounts, for example, about 0.5% by weight to about 10% by weight, of emulsifying agents may be included to promote dispersion of the concentrate in water. Suitable emulsifying agents include, among others, alkaryl sulfonates, sulfates of long-chain fatty acids, alkylaryl polyoxyethylene glycol ethers, sulfonated white oils, sorbitan esters of long-chain fatty acids, alkylamide sulfonates and the like. Although both anion- and cation-active wetting and emulsifying agents may be used for this purpose, the non-ionic agents are preferred since the concentrates in which they are present have increased stability and do not suffer phase separation when diluted with hard water. Suitable non-ionic agents which may be used are available commercially, for example, isoctyl phenyl polyethoxy ethanol, sold commercially as Triton X–100 and condensation products of ethylene oxide and higher fatty acid esters, for example, oleic acid ester of anhydrosorbitols, sold as Tweens.

Liquid compositions containing the thiobenzamides of the invention suitable for application to plants or to their environment contain the active agent in concentrations generally within the range of from about 0.01% by weight to about 50% by weight.

The invention includes novel solid compositions of matter wherein the active agent is absorbed or adsorbed in or on a sorptive carrier, such as finely divided clay, talc, gypsum, lime, wood flour, fuller's earth, kieselguhr, or the like. The solid composition, or dust, may contain from as little as 1% by weight of active material to 75% by weight of active material, or even more. It may be prepared as a dust, or as granules designed to be broadcast or to be worked into the soil. Compositions formulated as wettable powders are particularly suitable. Wettable powders can be prepared suitable for suspension in water with or without the aid of conventional dispersing or deflocculating agents and with or without such adjuvants as oils, stickers, wetting agents, etc.

For field application, the rate of application of the active agent may be varied from about 0.1 to 30 or more pounds per acre. It will be appreciated that the rate of application is subjected to variation according to the particular active agent used, the particular species of plants involved, and the local conditions, for example, temperature, humidity, moisture content of the soil, nature of the soil, and the like. Effective resolution of these factors is well within the skill of those well versed in the herbicide art.

The herbicidal compositions may contain a single thiobenzamide of the invention, as the sole active agent, or more than one such thiobenzamide or they may contain in addition thereto other biologically active substances. Thus, insecticides, e.g., DDT, endrin, dieldrin, aldrin, chlordane, methoxychlor, demeton, DDVP, naled, methyl parathion, parathion and other phosphorus-containing insecticides, rotenone and pyrethrum, and fungicides, such as copper compounds, ferbam, captan, and the like, may be incorporated in the compositions. Further, if desired, the herbicidal compositions may contain fertilizers, trace metals, or the like and when applied directly to the soil may additionally contain nematocides, soil conditioners other plant regulators, such as naphthalene acetic acid, 2,4-dichloro-phenoxyacetic acid and the like, and/or herbicides of different properties.

As can be seen from the foregoing table the compounds of the invention are effective herbicides having particular effect on seeds or germinating seeds as shown in the pre-emergence tests. The problem of distributing a small quantity of active compound over a relatively large area is overcome by applying the compound in the form of a composition.

We claim as our invention:

1. The N-acyl derivative of 2,6-dichlorothiobenzamide of the structure

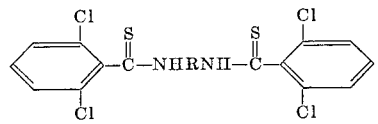

wherein R is an acyl radical of unsubstituted phthalic acid or unsubstituted dialkanoic acid of up to 6 carbon atoms.

2. The compound of the formula:

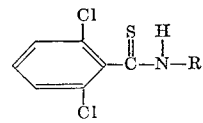

wherein R is an acyl group of up to 20 carbon atoms and is unsubstituted or substituted arylalkanoyl, diarylalkanoyl or aryloxyalkanoyl wherein the substituent is chlorine or alkyl of 1 to 4 carbon atoms.

3. The compound of the formula:

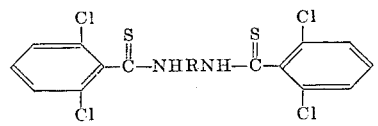

wherein R is an unsubstituted acyl radical of dialkanoic acid of up to 6 carbon atoms.

4. The compound of the formula:

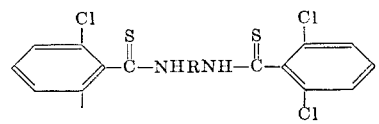

wherein R is an acyl radical of dialkanoic acid of up to 6 carbon atoms substituted with a chlorine atom or alkyl of 1 to 4 carbon atoms.

5. The compound of the formula:

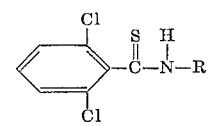

wherein R is a member of the group selected from phenylacetyl and chloro- and methyl-substituted phenylacetyl.

6. N-phenylacetyl-2,6-dichlorothiobenzamide.

7. N - (4-chloro-2-methylphenoxyacetyl)-2,6-dichlorothiobenzamide.

8. N - (2 - chlorophenylacetyl)-2,6-dichlorothiobenzamide.

9. N-(4-chlorophenoxyacetyl)-2,6-dichlorothiobenzamide.
10. N-(2,4-dichlorophenoxyacetyl)-2,6-dichlorothiobenzamide.
11. N,N'-bis-(2,6-dichlorothiobenzoyl)oxamide.

References Cited

FOREIGN PATENTS 612,252 7/1962 Belgium.
987,253 3/1965 Great Britain.

OTHER REFERENCES

Goerdelev et al.: Chem. Ber., vol. 95, pp. 627–31 (1962) D1.14.

HENRY R. JILES, *Primary Examiner.*

N. TROUSOF, *Assistant Examiner.*

U.S. Cl. X.R.

71—98; 260—544, 556, 562, 404, 559,